Dec. 27, 1955  E. G. BOICE ET AL  2,728,559
DRILL BITS

Filed Dec. 10, 1951  4 Sheets-Sheet 1

Elvin G. Boice
Robert G. Peter
INVENTORS

ATTORNEYS

Dec. 27, 1955  E. G. BOICE ET AL  2,728,559
DRILL BITS
Filed Dec. 10, 1951  4 Sheets-Sheet 3

Elvin G. Boice
Robert G. Peter
INVENTORS

BY Vincent Martin
and
Joe E. Edwards
ATTORNEYS

Dec. 27, 1955   E. G. BOICE ET AL   2,728,559
DRILL BITS
Filed Dec. 10, 1951    4 Sheets-Sheet 4
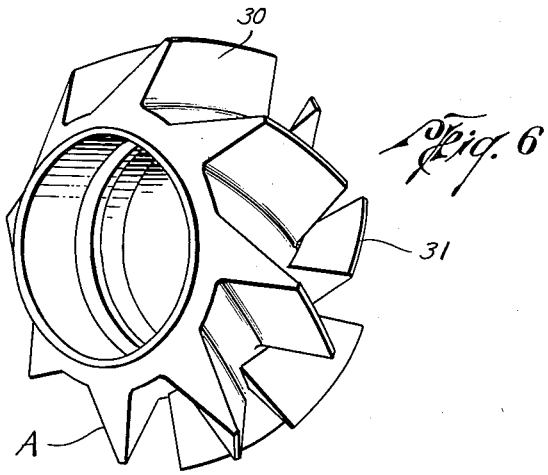
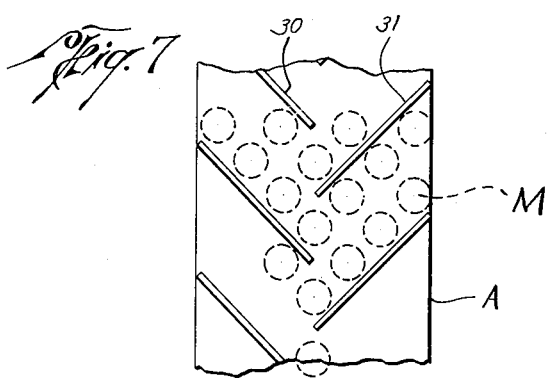
Elvin G. Boice
Robert G. Peter
INVENTORS
BY Vincent Martin
and
Jos. E. Edwards
ATTORNEYS

United States Patent Office 2,728,559
Patented Dec. 27, 1955

2,728,559

DRILL BITS

Elvin G. Boice and Robert G. Peter, Houston, Tex., assignors to Reed Roller Bit Company, Houston, Tex., a corporation of Texas Application December 10, 1951, Serial No. 260,858

3 Claims. (Cl. 255—334)

This invention relates to new and useful improvements in drill bits.

One object of the invention is to provide an improved two cutter drill bit having the supporting spindles or journals for the cutters so arranged that the cutter teeth may extend inwardly a maximum distance whereby the effective cutting area of the bit is increased.

An important object is to provide a two cutter drill bit wherein the spindle arrangement permits the use of a cantilever-type tooth construction whereby an appreciable overlap or interengagement of the inner portions of the cutter teeth on said cutters is possible to produce a maximum contact area between the teeth and the bottom of the hole and thereby increase drilling efficiency.

Still another object is to construct the central bridge structure usually employed in bits of this character integral with one of the spindles or journals to eliminate the ordinary separate bridge element; the inner ends of the spindles being supported in a manner which minimizes the exposure of non-cutting elements toward the bottom of the bore being drilled.

A further object is to form one of the cutters of the bit with herringbone-type teeth which increases the bottom hole coverage, the inner row of said cutter teeth being widely spaced and directed in a manner to provide for smoother rolling of the cutter while still providing good impact with the formation and efficient cutting action; the arrangement of the herringbone design facilitating manufacture of the cutter by eliminating the usual annular groove between cutter teeth which was required because of the mechanical limitations of the available milling equipment.

Another object is to form each of the cutters with two rows of cutting teeth, the teeth of the inner row of each cutter being of the cantilever-type and being adapted to overlap and interengage with the teeth of the other cutter of the bit to provide a two cutter bit having a maximum cutting zone.

Other objects will appear hereinafter.

Figures 1, 2:
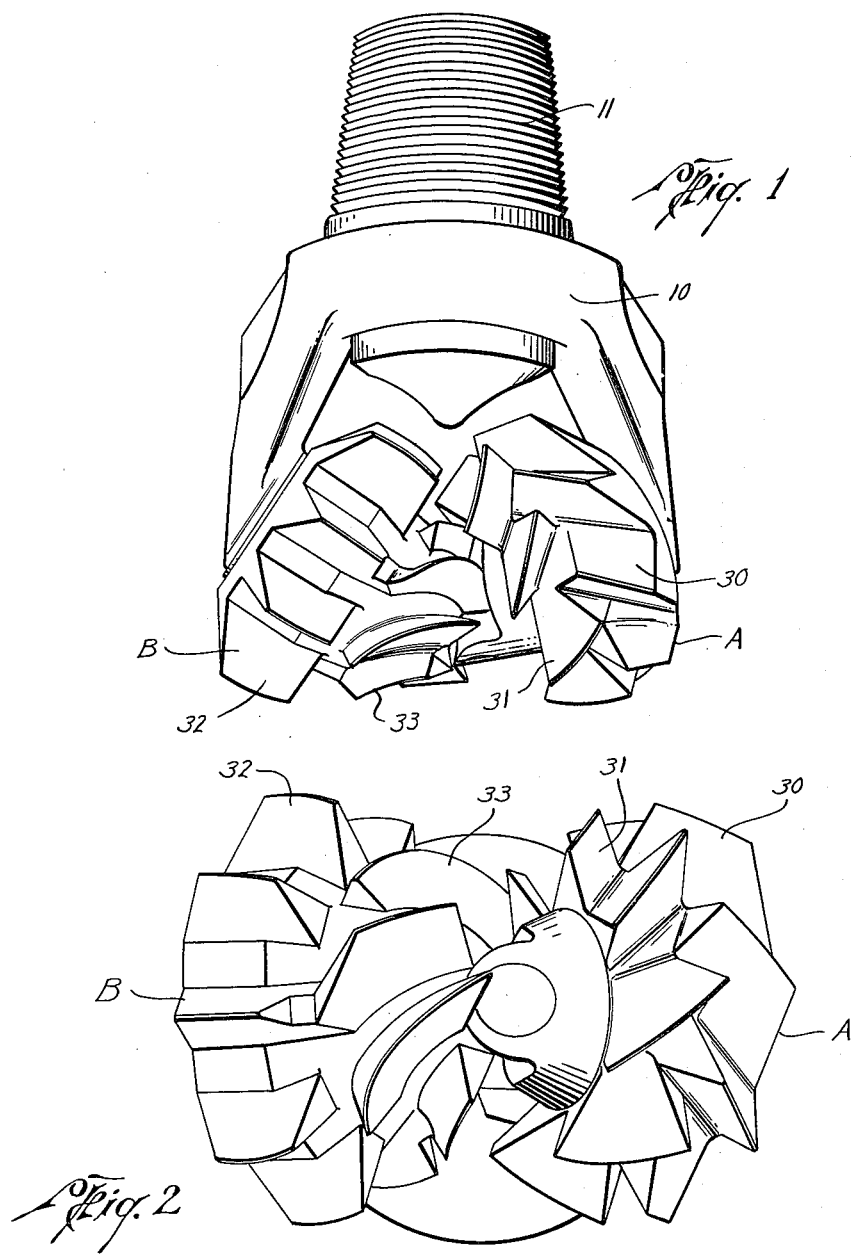
Figure 3:
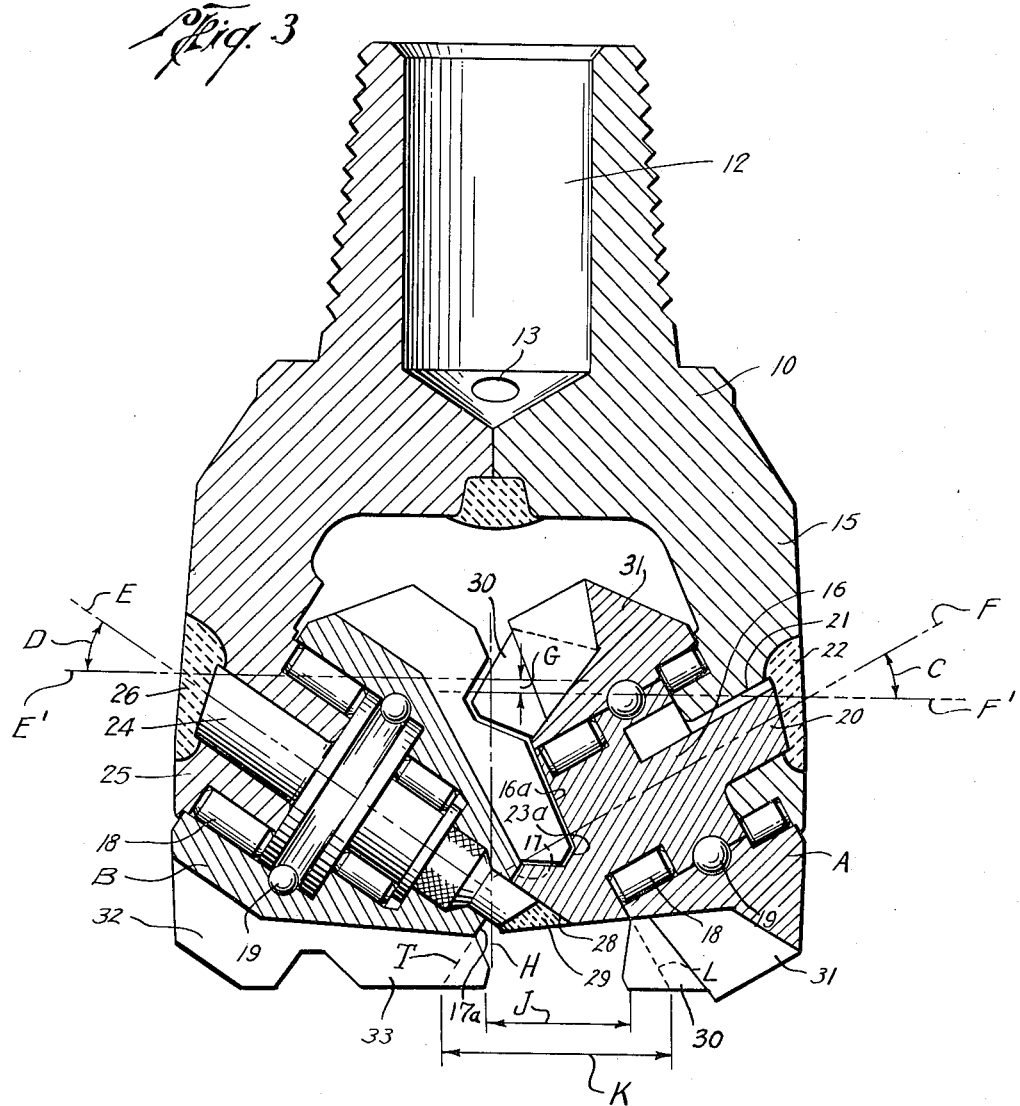
Figures 4, 5:
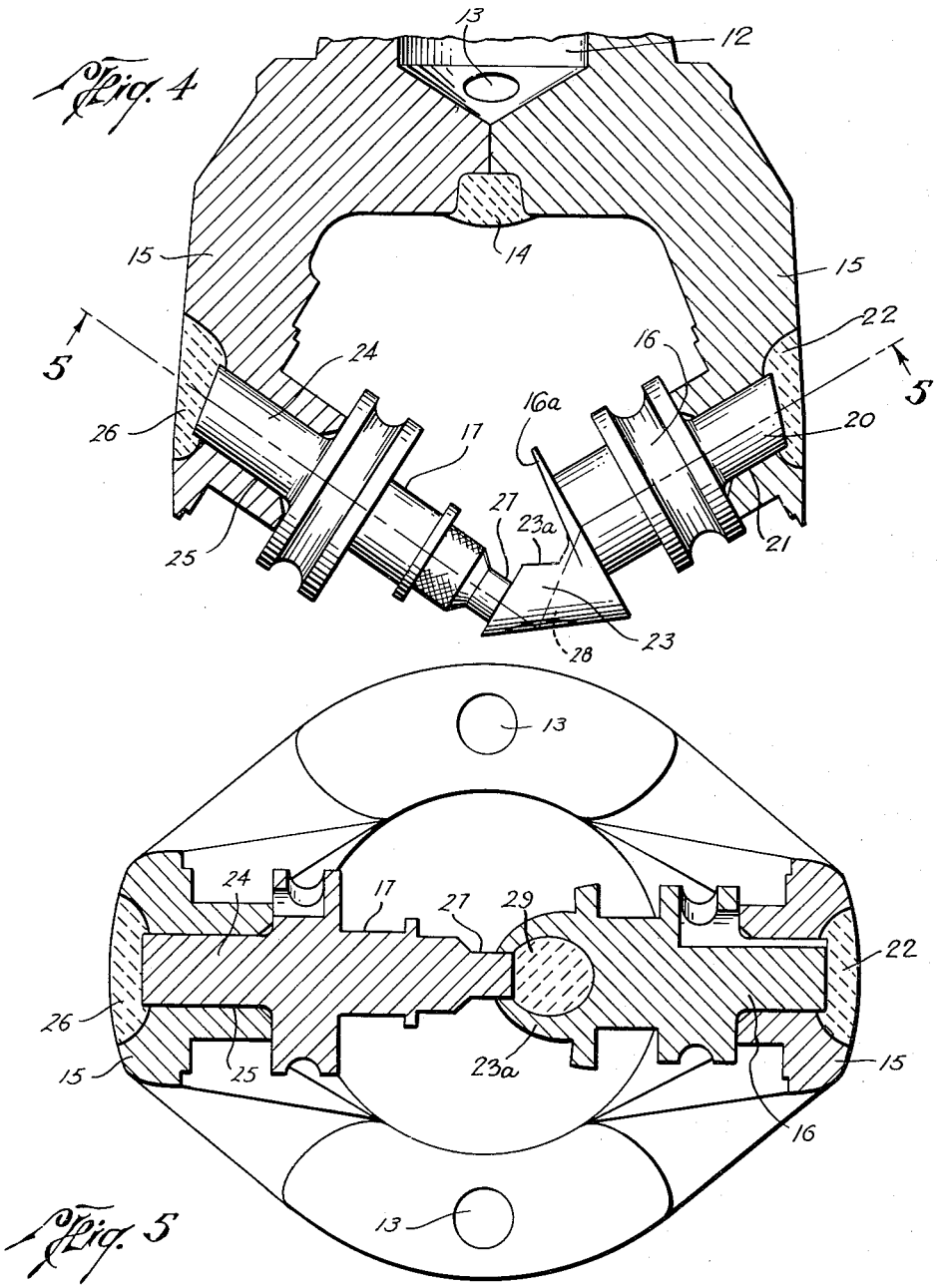

Figure 1 is an elevation of a two cutter bit, constructed in accordance with the invention, Figure 2 is a bottom view thereof, Figure 3 is an enlarged vertical, sectional view of the bit, Figure 4 is a partial sectional view, with the cutters removed from the spindles, Figure 5 is a sectional view taken on the line 5—5 of Figure 4, Figure 6 is a perspective view of the short or side cutter, and Figure 7 is a schematic view illustrating the manner of forming the cutter teeth of the side cutter by the usual milling tool.

In the drawings, the numeral 10 designates a bit body having the usual upwardly extending, externally threaded pin 11, preferably made integral therewith. A bore 12 extends through the bit body and pin, and the usual circulation ports 13 extend from its lower end. The bit body and pin may be made in two halves or sections which are fitted together and properly welded in the usual manner.

Depending legs 15 extend downwardly from the bit body in diametrically opposed relationship to each other and spindle shafts or journals 16 and 17 each have their outer ends supported within the legs 15. A short or side cutter A is adapted to be rotatably mounted on the shaft 16 while a long or cross roller B is arranged to mount on the shaft 17. The rollers are supported on suitable roller bearings 18 and ball bearings 19 in any suitable manner.

The particular mounting of the spindle shafts 16 and 17 with respect to each other is clearly illustrated in Figures 3 and 4. The shaft 16 has a reduced cylindrical portion 20 which engages within an opening 21 in one of the supporting legs 15 and is welded to the leg as indicated at 22. The longitudinal axis of the spindle or shaft 16 is disposed at a predetermined angle with respect to a horizontal plane and in actual practice this angle, indicated at C in Figure 3, is approximately 30°. The inner end of the shaft or spindle 16 is formed with an extension 23, which when the shaft is in place on the bit body is disposed at substantially the axial center of the bit.

The shaft 17 has a reduced cylindrical extension 24 at its outer end engageable within an opening 25 in the opposite leg of the bit, and said reduced portion is welded as indicated at 26 to said supporting leg. The shaft 17 is also disposed at an angle from a horizontal plane, and this angle indicated at D in Figure 3, is greater than the angle C at which the shaft 16 is disposed; in actual practice, the angle D is 33°. In addition to the angle of the shaft 17 being different than the angle of the shaft 16, the shaft 17 is raised vertically in a slightly higher plane than is the shaft 16 whereby the intersection of the center line E of the shaft 17 with the outer surface of its supporting leg is in a higher horizontal plane E' than the plane F' in which the intersection of the axis F of shaft 16 with the outer surface of its leg is located. The difference in this offset is clearly shown by the space G and by so offsetting the shafts, the axes E and F of the two shafts do not intersect at the axis or center line H of the bit body.

The inner end of the shaft 17 has a reduced cylindrical shank 27 which is adapted to engage an opening 28 in the extension 23 on the shaft 16 and the inner ends of the two shafts are connected by suitable welding 29. By forming the extension on the shaft 16 and by connecting the inner end of the shaft 17 thereto, the necessity for providing a separate bridge element is eliminated which simplifies the construction of the bit.

The short or side cutter A is mounted on the shaft 16 and its construction is illustrated in Figure 6. The cutter is formed with an outer row of cutter teeth 30 and an inner row of cutter teeth 31 which are arranged in a herringbone pattern. It has been found that the angle of disposition of the herringbone teeth 30 and 31 is preferably at approximately 45° with respect to the axis of the cutter, although the invention is not to be limited to this particular angle since some variation may occur. By arranging the teeth 30 and 31 in herringbone pattern the necessity for an annular groove in the external surface of the cutter between the teeth is eliminated. Referring to Figure 7, where the dotted circles M represent the milling cutter it will be seen that the teeth 30 and 31 may be formed without leaving any annular groove about the external surface of the cutter. In prior tooth arrangements, the annular groove was required to overcome the mechanical limitations of available milling equipment. Obviously, by eliminating such groove the bottom hole coverage of the cutter is increased. Further the herringbone pattern of tooth construction has been found to provide for smoother operation without sacrificing cutting efficiency.

In addition to the herringbone pattern the inner row of teeth 31 are of the cantilever type, that is, the end of each tooth projects outwardly beyond the plane of the end 16a (Fig. 3) of the cutter. In prior practice, it has been usual to terminate the teeth in the plane indicated by the dotted line L in Figure 3, that is, the cutter teeth terminated in the same plane as the inner face 16a of the shaft 16. By extending the teeth in the manner shown it will be evident that an increased tooth contact with the formation will be produced.

The cutter B is illustrated in Figures 1 and 2 and includes an outer row of teeth 32 and an inner row of teeth 33. Each tooth of the outer row 32 is substantially straight or with its cutting edge in a longitudinal plane parallel to the axis of the cutter while each tooth of the inner row 33 is disposed on a helix or spiral. Each tooth of the inner row of teeth 33 is of the cantilever type and the extended end thereof is arranged to overlap the inner teeth 31 of the cutter A as is clearly illustrated in Figure 3. Since the inner end of each tooth 33 extends beyond the end face 17a of the cutter B, the extension 23 on the shaft 16 is recessed as shown at 23a to accommodate the same. Ordinarily, the teeth 33 have been terminated along the dotted line T in Figure 3 and by extending the teeth in the manner illustrated, an increased cutting area is provided.

By disposing the spindles in the manner hereinbefore described and constructing the cutters A and B to provide for the overlapping of the inner teeth 31 of cutter A with the cutter B and the extension of the inner teeth 33 on the cutter B, the cutting zone or area of the cutters is increased to provide for a more efficient drilling operation. As indicated in Figure 4 the spacing between the cutter ends is indicated by the arrow J; if the cutters are made in a normal manner without the ends of the teeth being extended in the manner hereinbefore described, the spacing would be as shown by the arrow K in Figure 4, and it is therefore evident that the amount of formation which is not contacted by the bit is materially reduced. This provides for increased drilling efficiency and better cutting action.

The disposition of the spindles 16 and 17 not only makes it possible to provide cutters having increased contact area with the formation but also makes possible the proper support of the inner ends of the spindles without the necessity of a separate bridge element. The extension 23 which is formed on the shaft 16 functions as the bridge and provides an arrangement whereby the two spindles or shafts may be securely anchored to each other to properly support the same. In addition to providing amplified cutting area, the particular arrangement minimizes the exposure of non-cutting elements to the bottom of the hole, since the space at the central portion of the bore is materially reduced.

From the foregoing, it will be evident that a two cutter bit having a maximum contact with the formation is provided. The cutters A and B, being formed with cantilever-type inner teeth overlap and interengage to increase the contact area; in addition the provision of the herringbone pattern on the cutter A not only facilitates the manufacture of the cutter but also increases the cutting area of said cutter.

We claim:

1. A drill bit including, a bit body having a pair of inwardly directed supporting shafts, a relatively short roller mounted on one of the spindles and having two rows of teeth arranged in a herringbone pattern on its external surface, a relatively long roller mounted on the opposite spindle and having an outer row of straight teeth and an inner row of spiral teeth spaced sufficiently to receive the extended portion of the teeth of the roller cutter on the other spindle, the teeth of the inner row on the relatively short cutter being extended beyond the inner face of the cutter and having a portion thereof in interfitting relationship with the cutter teeth of the long cutter by projecting into a portion of the area between the inner and outer rows of teeth on the relatively long cutter.

2. A drill bit including, a bit body having a pair of inwardly directed supporting shafts, a relatively short roller mounted on one of the spindles and having two rows of teeth arranged in a herringbone pattern on its external surface, a relatively long roller mounted on the opposite spindle and having an outer row of straight teeth and an inner row of spiral teeth, the teeth of the inner row on the relatively short cutter being extended beyond the inner face of said short cutter and the teeth on the inner row of the relatively long cutter being extended beyond the inner face of said long cutter, a portion of the extended teeth on the short roller interfitting with a portion of the extended teeth on the long roller.

3. A drill bit including, a bit body, a pair of diametrically opposed spindles mounted on the body and directed inwardly toward each other at an inclination to a plane extending transversely of the bit, means for connecting the inner ends of the spindles to each other, and cutters rotatably mounted on the spindles, the angle of inclination of one of the spindles being different than the angle of inclination of the other cutter, whereby the intersection of the axes of the two spindles is at a point misaligned with the axial center of the bit, each cutter having cutter teeth which extend beyond the inner face of each cutter body, the extended teeth of one cutter having a portion thereof disposed in interfitting relationship with a portion of the extended teeth of the other cutter.

References Cited in the file of this patent

UNITED STATES PATENTS

| | | |
|---|---|---|
| 1,896,295 | Evans et al. | Feb. 7, 1933 |
| 1,905,066 | Scott | Apr. 25, 1933 |
| 2,046,739 | Harrington | July 7, 1936 |
| 2,047,110 | Reed | July 7, 1936 |
| 2,047,116 | Reed | July 7, 1936 |
| 2,133,022 | Fisher | Oct. 11, 1938 |
| 2,147,926 | Scott | Feb. 21, 1939 |